Patented Nov. 30, 1943

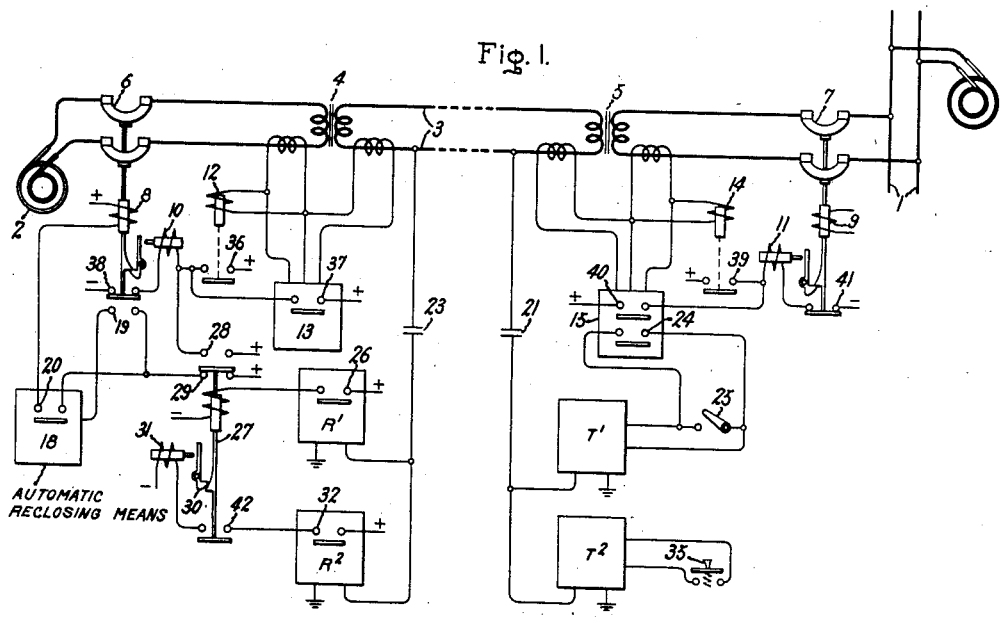

2,335,650

UNITED STATES PATENT OFFICE 2,335,650

ALTERNATING CURRENT RECLOSING BREAKER SYSTEM

Theron A. Cramer, Schenectady, N. Y., assignor to General Electric Company, a corporation of New York Application October 21, 1942, Serial No. 462,827

7 Claims. (Cl. 175—294)

My invention relates to alternating current systems and particularly to such systems employing transformer banks having one or more windings permanently connected to a circuit containing no circuit interrupter and arranged to be energized from some other source than the transformer. For example, an alternating current distribution system may be supplied from a remote automatic generating station through a high-voltage transmission line, the generator voltage at the remote generating station being stepped up thereat by means of a transformer to the transmission line voltage and, at the distribution circuit end of the line, the voltage is stepped down to the voltage of the distribution circuit by another transformer. In order to save expense, circuit breakers may be provided only in the low-voltage circuits of the transformers with the result that faults in a transformer or on either low-voltage circuit may not produce, due to the impedance drop of the transformer in the line, sufficient current at the other end of the line to effect the opening of the circuit breaker thereat.

One object of my invention is to provide an arrangement of apparatus for effecting in an alternating current system of the type above described the opening of the circuit breaker at the remote end of the line when a fault occurs near the other end of the line.

My invention will be better understood from the following description when taken in connection with the accompanying drawing, Fig. 1 of which diagrammatically illustrates a portion of an alternating current system embodying my invention and Fig. 2 diagrammatically illustrates a modification of the arangement shown in Fig. 1, and the scope of my invention will be pointed out in the appended claims.

Referring to Fig. 1 of the drawing, I represents an alternating current distribution circuit which is supplied from a plurality of sources of current, one of which, 2, is connected to the distribution circuit by means of a long high-voltage transmission line 3 comprising a step-up transformer 4 at the source end of the transmission line and a step-down transformer 5 at the distribution circuit end of the transmission line. A suitable circuit breaker 6 is provided between the source 2 and low-voltage winding of the transformer 4, and a suitable circuit breaker 7 is provided between the low-voltage winding of the transformer 5 and the distribution circuit 1. The high-voltage windings of the transformers 4 and 5 are, however, permanently connected together.

The circuit breakers 6 and 7 are shown as latched closed circuit breakers respectively provided with the closing coils 8 and 9 and the trip coils 10 and 11. Suitable fault responsive means such as an overcurrent relay 12 responsive to the current flowing between the source 2 and the low voltage winding of the transformer 4 and a transformer differential protective arrangement 13, examples of which are well known in the art, are provided for respectively effecting the energization of the trip coil 10 to open the circuit breaker 6 when a predetermined overcurrent flows through the circuit breaker 6 or a fault occurs within the transformer 4. The circuit breaker 7 has associated therewith a similar overcurrent relay 14 and a similar transformer differential protective arrangement 15 for effecting the energization of the trip coil 11 to open the circuit breaker 7 when a predetermined overcurrent flows through the circuit breaker 7 or a fault occurs within the transformer 5.

For the purpose of this description, it will be assumed that the source 2 and the associated transformer 4 and the circuit breaker 6 are located at a remote point where there is no operator and that the circuit breaker 6 has associated therewith suitable automatic reclosing means 18, examples of which are well known in the art, for effecting the reclosing of the circuit breaker 6 a predetermined number of times within a predetermined time interval after the initial opening thereof has been effected by the associated fault responsive means 12 or 13. As shown, the operation of the automatic reclosing means 18 is initiated by the closing of the auxiliary contacts 19 on the circuit breaker 6, and the closing of the contacts 20 of the reclosing means 18 completes an energizing circuit for the closing coil 8 of the circuit breaker 6. Therefore, faults which effect the operation of the overcurrent relay 12 or the transformer differential protective means 13 cause the circuit breaker 6 to be opened and reclosed automatically, and if the fault is of a permanent character, the circuit breaker is caused to be opened and reclosed automatically a predetermined number of times and then is permanently locked open in a manner well known in the art.

Faults at one end of the transmission line 3, such as a fault in the transformer 5, may occur which effect the operation of the associated transformer differential protective means 15 to cause the circuit breaker 7 to open but which do not cause sufficient fault current to flow from the source 2 to effect the operation of the overcurrent relay 12 to open the circuit breaker 6. In order to insure that the circuit breaker 6 is opened and the automatic reclosing means 18 is rendered inoperative to effect a reclosure of the circuit breaker 6 when it is opened under such abnormal operating conditions, I provide, in accordance with my invention, an arrangement of apparatus which causes a signal of a predetermined character to be transmitted from the distribution circuit end of the transmission line 3 to the generator end thereof whenever a predetermined fault responsive means at the distribution circuit end of the line operates to effect the opening of the circuit breaker at that end, and which causes the signal at the generator end of the line to effect the opening of the circuit breaker at that end and to render the associated automatic reclosing means inoperative to effect an automatic reclosure of the circuit breaker. In the particular embodiment of my invention shown in Fig. 1, I provide a high frequency transmitter $T^1$ of any suitable type, which is connected to one of the conductors of the high-voltage transmission line at the distribution circuit thereof by suitable coupling means 21 and a high frequency receiver $R^1$ which is tuned to the frequency of the transmitter $T^1$ and which is connected at the generator end of the transmission line 3 by means of the coupling means 23 to the same high-voltage conductor of the transmission line 3 that the transmitter $T^1$ is connected. The transmitter $T^1$ is normally inoperative but is arranged to be set into operation by the closing of the contacts 24 of the transformer differential protective means 15 or the closing of a suitable manually controlled switch 25. The receiver $R^1$, when operated, effects the closing of the contacts 26 to complete an energizing circuit for a control relay 27, which in turn, by closing its contacts 28 and opening its contacts 29, effects the opening of the circuit breaker 6 and prevents the automatic reclosing means 18 from effecting the reclosing of the circuit breaker 6. Relay 27 is arranged in any suitable manner so that it remains in its energized position after the original energizing circuit therefor is interrupted. As shown in the drawing, the relay 27 is provided with a latch 30 which holds the relay in its energized position and which is arranged to be released in response to the energization of a release coil 31. The energizing circuit for the release coil 31 is arranged to be completed by the closing of the contacts 32 of a suitable receiver $R^2$ which is also connected to the transmission line 3 by the coupling means 23 and which is tuned to a different frequency than the receiver $R^1$. A transmitter $T^2$ is connected to the transmission line 3 by the coupling means 21 at the distribution circuit end of the line 3 and is tuned to the same frequency as the receiver $R^2$. A suitable manually controlled switch 35 is provided for rendering the transmitter $T^2$ operative to transmit current of the proper frequency over the transmission line 3 to operate the receiver $R^2$.

The operation of the embodiment of my invention shown in Fig. 1 will be obvious from the above description. When a fault occurs which causes sufficient current to flow through the circuit breaker 6 to cause the overcurrent relay 12 to close its contacts 36 or a fault occurs in the transformer 4 which causes the transformer differential protective means 13 to close its contacts 37, a circuit is completed for the trip coil 10 through the auxiliary contacts 38 on the circuit breaker 6 to effect the opening thereof. The closing of the auxiliary contacts 19 of the circuit breaker 6 in response to the opening thereof effects the operation of the automatic reclosing means 18 to effect in a manner well known in the art the automatic reclosing of the circuit breaker 6. Similarly, when a fault occurs which causes sufficient current to flow through the overcurrent relay 14 to effect the closing of contacts 39 thereof or a fault occurs in the transformer 5 which causes the transformer differential protective means 15 to close its contacts 40, an energizing circuit is completed for the trip coil 11 through the auxiliary contacts 41 of the circuit breaker 7 to effect the opening thereof.

In order to insure that the transformer 5 is permanently disconnected from all the sources whenever a fault occurs therein which effects the opening of the circuit breaker 7, the closing of the contacts 24 of the transformer differential protective means 15 completes an operating circuit for the transmitter $T^1$ so that current of the proper frequency is transmitted over the transmission line 3 to cause the receiver $R^1$ at the generator end to close its contacts 26 and complete an energizing circuit for the control relay 27. By closing its contacts 28, the control relay 27 effects the energization of the trip coil 10 to open the circuit breaker 6, and by opening its contacts 29, the relay 27 prevents the automatic reclosing means 18 from effecting any reclosure of the circuit breaker 6. Therefore, the circuit breaker 6 remains open until the control relay 27 is restored to its normal position. This result can be accomplished from the distribution circuit end of the transmission line by closing the switch 35 thereat so as to render the transmitter $T^2$ operative to transmit over the transmission line 3 a current of the proper frequency to operate the receiver $R^2$ and cause it to close its contacts 32 and complete through contacts 42 of the relay 27 an energizing circuit for the release coil 31. The closing of the contacts 29 of the control relay 27 renders the automatic reclosing means operative to reclose the circuit breaker 6.

In Fig. 2, I have shown a modification of the embodiment of my invention shown in Fig. 1 in which the closing of the contacts 24 and 24' of the transformer differential protective means 15 are arranged to effect the simultaneous operation of the two transmitters $T^1$ and $T^2$ and the circuit of the operating coil of the control relay 27 includes in series the contacts 26 of the receiver $R^1$ and the contacts 32 of the receiver $R^2$ so that both of these receivers must be simultaneously operated to effect the operation of the control relay 27. The circuit of the release coil 31 of the control relay 27 includes the contacts 32 of the receiver $R^2$ and the contacts 44 of the receiver $R^1$ which are closed when the receiver $R^1$ is not operating in response to current transmitted over the transmission line 3 from the transmitter $T^1$. Therefore, in the modification shown in Fig. 2, the control relay 27 is operated to its energized position by the simultaneous operation of the transmitters $T^1$ and $T^2$ at the distribution circuit end of the transmission line and can be restored to its normal position by effecting the operation of only the transmitter $T^2$ at the distribution circuit end of the transmission line.

While I have disclosed only an arrangement for effecting the opening of the circuit breaker 6 in response to a fault in the remote transformer, it will be obvious that a similar arrangement could be used for effecting the opening of the circuit breaker 7 in response to a fault in the remote transformer 4.

Furthermore, it is obvious that the channel for transmitting the signal may be obtained in any well known manner such for example as by adding modulating frequencies to a carrier current channel which is also used for pilot relaying. Such an arrangement is disclosed in my United States Letters Patent 2,199,168, granted April 30, 1940.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current circuit including a power transformer, two circuit breakers respectively connected in said circuit on opposite sides of said transformer, a plurality of fault responsive means connected to said circuit and each of said fault responsive means being respectively arranged to effect the opening of a different circuit breaker, automatic reclosing means associated with one of said circuit breakers for effecting the reclosure thereof, and means controlled by the fault responsive means controlling the other of said circuit breakers for effecting the opening of said one of said circuit breakers and for rendering said automatic reclosing means inoperative to reclose said one of said circuit breakers.

2. In combination, an alternating current circuit including a power transformer, two circuit breakers respectively connected in said circuit on opposite sides of said transformer, a plurality of fault responsive means connected to said circuit and each of said fault responsive means being respectively arranged to effect the opening of a different circuit breaker, automatic reclosing means associated with one of said circuit breakers for effecting the reclosure thereof, means controlled by the fault responsive means controlling the other of said circuit breakers for effecting the transmission of a signal over said circuit, signal responsive means associated with said one of said circuit breakers for effecting the opening of said one of said circuit breakers and for rendering said automatic reclosing means inoperative to reclose said one of said circuit breakers.

3. In combination, an alternating current circuit including a power transformer, two circuit breakers respectively connected in said circuit on opposite sides of said transformer, a plurality of fault responsive means connected to said circuit and each of said fault responsive means being respectively arranged to effect the opening of a different circuit breaker, automatic reclosing means associated with one of said circuit breakers for effecting the reclosure thereof, high frequency transmitting means associated with the other of said circuit breakers, means controlled by the fault responsive means controlling said other circuit breaker for effecting the operation of said transmitting means, receiving means associated with said one of said circuit breakers and responsive to the operation of said transmitting means, and means responsive to the operation of said receiving means for effecting the opening of said one of said circuit breakers and for rendering said automatic reclosing means inoperative to reclose said one of said circuit breakers.

4. In combination, an alternating current circuit including a power transformer, two circuit breakers respectively connected in said circuit on opposite sides of said transformer, a plurality of fault responsive means connected to said circuit and each of said fault responsive means being respectively arranged to effect the opening of a different circuit breaker, automatic reclosing means associated with one of said circuit breakers for effecting the reclosure thereof, high frequency transmitting means associated with the other of said circuit breakers, means controlled by the fault responsive means controlling said other circuit breaker for effecting the operation of said transmitting means to transmit a signal of a predetermined character, and means associated with said one of said circuit breakers and responsive to said signal for effecting the opening of said one of said circuit breakers and for rendering said automatic reclosing means inoperative to reclose said one of said circuit breakers.

5. In combination, an alternating current circuit including a power transformer, two circuit breakers respectively connected in said circuit on opposite sides of said transformer, a plurality of fault responsive means connected to said circuit and each of said fault responsive means being respectively arranged to effect the opening of a different circuit breaker, automatic reclosing means associated with one of said circuit breakers for effecting the reclosure thereof, high frequency transmitting means associated with the other of said circuit breakers, means controlled by the fault responsive means controlling said other circuit breaker for effecting the operation of said transmitting means to transmit a signal of a predetermined character, means associated with said one of said circuit breakers and responsive to said signal for effecting the opening of said one of said circuit breakers and for rendering said automatic reclosing means inoperative to reclose said one of said circuit breakers, means for effecting the operation of said transmitting means to transmit a signal of a different predetermined character, and receiving means associated with said one of said circuit breakers and responsive to said signal of said different predetermined character for rendering said automatic reclosing means again operative to reclose said one of said circuit breakers.

6. In combination, an alternating current circuit including a power transformer, two circuit breakers respectively connected in said circuit on opposite sides of said transformer, a plurality of fault responsive means connected to said circuit and each of said fault responsive means being respectively arranged to effect the opening of a different circuit breaker, automatic reclosing means associated with one of said circuit breakers for effecting the reclosure thereof, high frequency transmitting means associated with the other of said circuit breakers, means controlled by the fault responsive means controlling said other circuit breaker for effecting the operation of said transmitting means so as to transmit simultaneously two currents of different predetermined frequencies, receiving means associated with said one of said circuit breakers and responsive to the simultaneous reception of both of said predetermined frequencies for effecting the opening of said one of said circuit breakers and for rendering said automatic reclosing means inoperative to reclose said one of said circuit breakers.

7. In combination, an alternating current circuit including a power transformer, two circuit breakers respectively connected in said circuit on opposite sides of said transformer, a plurality of fault responsive means connected to said circuit and each of said fault responsive means being respectively arranged to effect the opening of a different circuit breaker, automatic reclosing means associated with one of said circuit breakers for effecting the reclosure thereof, high frequency transmitting means associated with the other of said circuit breakers, means controlled by the fault responsive means controlling said other circuit breaker for effecting the operation of said transmitting means so as to transmit simultaneously two currents of different predetermined frequencies, receiving means associated with said one of said circuit breakers and responsive to the simultaneous reception of both of said predetermined frequencies for effecting the opening of said one of said circuit breakers and for rendering said automatic reclosing means inoperative to reclose said one of said circuit breakers, means for effecting the operation of said transmitting means to transmit a current of only one of said predetermined frequencies, and receiving means associated with said one of said circuit breakers and responsive to current of only said one of said predetermined frequencies for rendering said automatic reclosing means again operative to reclose said one of said circuit breakers.

THERON A. CRAMER.